United States Patent
Milton

(10) Patent No.: US 6,751,309 B2
(45) Date of Patent: Jun. 15, 2004

(54) METHOD AND APPARATUS FOR EXTENDING CALLS TO INTERNAL SWITCH EXTENSIONS OUT TO EXTERNAL NETWORK ENDPOINTS

(75) Inventor: Stephen M. Milton, Freehold, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 381 days.

(21) Appl. No.: 09/908,156

(22) Filed: Jul. 18, 2001

(65) Prior Publication Data
US 2003/0016810 A1 Jan. 23, 2003

(51) Int. Cl.[7] .......................... H04M 3/00; H04M 3/42; H04M 7/00
(52) U.S. Cl. ............. 379/246; 379/201.12; 379/221.14; 379/233; 379/234
(58) Field of Search ....................... 379/201.01, 201.02, 379/201.12, 207.11, 219, 220.01, 221.14, 230, 231, 232, 233, 242, 245, 246, 901; 455/414.1

(56) References Cited

U.S. PATENT DOCUMENTS

| | | | | |
|---|---|---|---|---|
| 5,247,571 A | * | 9/1993 | Kay et al. ............... | 379/221.09 |
| 5,339,356 A | * | 8/1994 | Ishii ............................ | 379/234 |
| 5,404,395 A | * | 4/1995 | Bogart et al. .......... | 379/201.03 |
| 5,452,347 A | * | 9/1995 | Iglehart et al. ............ | 379/199 |
| 6,038,302 A | | 3/2000 | Burok et al. ........... | 379/201.01 |
| 6,169,797 B1 | * | 1/2001 | Wildgrube et al. ......... | 379/233 |
| 6,516,061 B2 | * | 2/2003 | Horowitz et al. ........... | 379/233 |

* cited by examiner

Primary Examiner—Harry S. Hong
(74) Attorney, Agent, or Firm—Ryan, Mason & Lewis, LLP

(57) ABSTRACT

A private branch exchange (PBX) or other communication system switch processes a call to determine if an identifier associated with the call has a corresponding entry in a stored list of external endpoints registered with the switch. The switch directs the call to an external port of the switch for delivery to a given one of the external endpoints if the identifier associated with the call has a corresponding entry in the stored list of external endpoints registered with the switch. The given external endpoint does not have a fixed external port assignment in the switch. Instead, the switch dynamically selects from a set of external ports an available external port over which the call is directed to the given external endpoint. The dynamic selection of the available external port may be implemented using an automatic route selection (ARS) algorithm. The switch in an illustrative embodiment directs the call to an external port of the switch via a loop-back arrangement implemented between port cards of the switch, e.g., a loop-back trunk between an output port associated with a first port card of the switch and an input port associated with a second port card of the switch. Advantageously, the registered external endpoint is treated by the switch as if it were an internal extension serviced by the switch, such that desirable switch features may thereby be made available to the external endpoint.

19 Claims, 4 Drawing Sheets

METHOD AND APPARATUS FOR EXTENDING CALLS TO INTERNAL SWITCH EXTENSIONS OUT TO EXTERNAL NETWORK ENDPOINTS

RELATED APPLICATION

The present invention is related to an invention described in U.S. patent application Ser. No. 09/908,155, filed concurrently herewith in the name of inventor Stephen M. Milton and entitled "Method and Apparatus for Treating Externally-Originated Calls as Coming From Internal Switch Extensions," which is incorporated by reference herein.

FIELD OF THE INVENTION

The invention relates generally to call processing in communication systems, and more particularly to systems in which calls or other communications are directed by a switch to or from wired or wireless telephones or other types of user terminals.

BACKGROUND OF THE INVENTION

Conventional communication system switches, such as private branch exchanges (PBXs) and other premises-based telephone switches, generally support a wide variety of useful features, such as bridged call appearances, hunt groups, call forwarding, navigable directories, multi-call conferencing, etc. However, these and other switch-based features are typically provided only to those user terminals that represent internal extensions within the premises serviced by the switch. As a result, a user terminal associated with an external network is generally unable to avail itself of the full set of features supported by the switch.

By way of example, a mobile telephone or other mobile device representing a given external endpoint of the system generally cannot be treated as an internal extension of a conventional switch. A call directed from an internal extension of the switch to the given endpoint therefore must be processed as any other call to an endpoint of an external network, even if the given external endpoint is a device known to be associated with a user of an internal extension of the switch.

It is known in the art to implement call forwarding routines that will allow a call directed from one internal extension to another to be forwarded to a designated mobile telephone or other endpoint of an external network. However, in conventional call forwarding, the designated mobile telephone is not treated as if it were an internal extension serviced by the switch, and is generally unable to access many desirable features of the switch. Conventional switches are thus unable to extend switch-based features to such a call in an efficient and cost-effective manner.

A need therefore exists for call processing techniques that allow mobile telephones and other external system endpoints to access premises-based communication switch features in a manner similar to an internal extension serviced by the switch.

SUMMARY OF THE INVENTION

The present invention provides methods and apparatus for extending calls directed to internal switch extensions out to external networks, so as to allow a mobile telephone or other external endpoint to be treated as if it were an internal extension serviced by the switch.

In accordance with one aspect of the invention, a private branch exchange (PBX) or other communication system switch processes a call to determine if an identifier associated with the call has a corresponding entry in a stored list of external endpoints registered with the switch. The switch directs the call to an external port of the switch for delivery to a given one of the external endpoints if the identifier associated with the call has a corresponding entry in the stored list of external endpoints registered with the switch. The given external endpoint in an illustrative embodiment of the invention does not have a fixed external port assignment in the switch. Instead, the switch dynamically selects from a set of external ports an available external port over which the call is directed to the given external endpoint. The dynamic selection of the available external port may be implemented using an automatic route selection (ARS) algorithm.

In an illustrative embodiment of the invention, the switch directs the call to an external port of the switch via a loop-back arrangement implemented between port cards of the switch, e.g., a loop-back trunk between an output port associated with a first port card of the switch and an input port associated with a second port card of the switch. In other embodiments, the loop-back arrangement may be eliminated and the call routed directly to an external port of the switch after application of the ARS algorithm.

Advantageously, the invention allows a mobile telephone or other external endpoint to be treated as if it were an actual internal extension serviced by the switch. This in turn allows a given external endpoint to access at least a subset of the desirable call processing features provided by the switch, and thereby overcomes one or more of the above-described problems associated with conventional techniques.

DETAILED DESCRIPTION OF THE INVENTION

The invention will be illustrated below in conjunction with an exemplary communication system. Although well suited for use with, e.g., a system having a private branch exchange (PBX) or other similar call processing switch, the invention is not limited to use with any particular type of communication system switch or configuration of system elements. Those skilled in the art will recognize that the disclosed techniques may be used in any communication application in which it is desirable to provide improved control of calls directed to external endpoints from internal extensions of a PBX or other communication system switch. The term "call" as used herein is intended to include not only telephone calls but also non-telephonic communications such as data transmissions, voice-over-IP, facsimile, etc.

Figure 1:
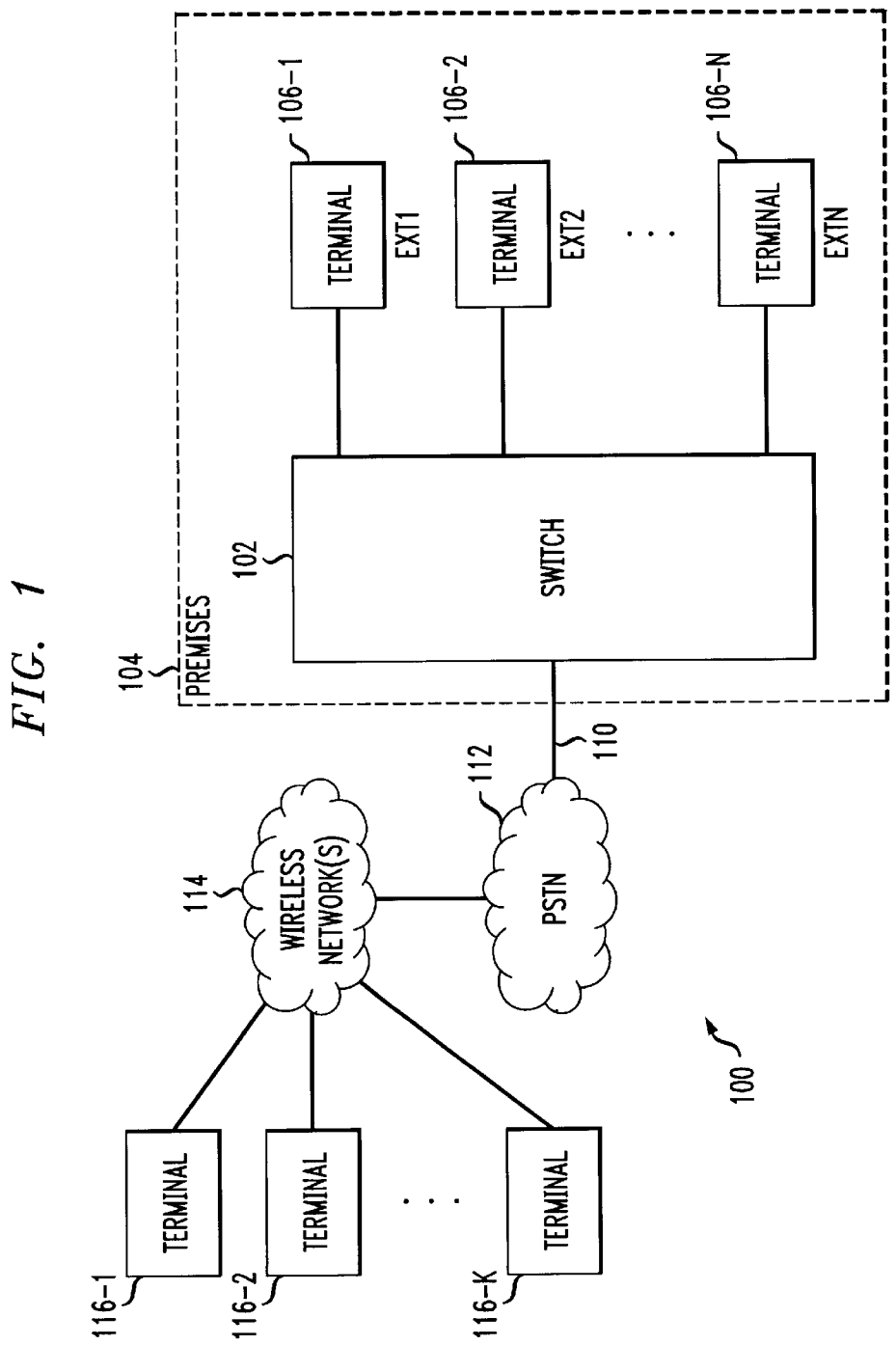
FIG. 1 shows an exemplary communication system in which the invention is implemented.

FIG. 1 shows an exemplary communication system 100 in which the invention is implemented. The system 100 includes a switch 102 which serves a premises 104 having a number of terminals 106-1, 106-2, . . . 106-N. Each of the terminals 106-1, 106-2, . . . 106-N corresponds to one of a set of internal extensions Ext1, Ext2, . . . ExtN as shown. These extensions are referred to herein as "internal" in that they are extensions within the premises 104 that are directly serviced by the switch. More particularly, these extensions correspond to conventional terminal endpoints serviced by the switch, and the switch can direct incoming calls to and receive outgoing calls from these extensions in a conventional manner.

The term "switch" as used herein should be understood to include a PBX, an enterprise switch, or other type of telecommunications system switch, as well as other types of processor-based communication control devices such as servers, computers, adjuncts, etc.

By way of example, the switch 102 in the illustrative embodiment may be implemented as an otherwise conventional DEFINITY® Enterprise Communication Service (ECS) communication system switch available from Avaya Inc. of Basking Ridge, N.J., USA. Other types of known switches may be used. The conventional aspects of such switches are well known in the art and therefore not described in detail herein.

The terminals 106 may be wired desktop telephone terminals or any other type of terminals capable of communicating with the switch 102. The word "terminal" as used herein should therefore be understood to include not only wired or wireless desktop telephone terminals, but also other types of processor-based communication devices, including but not limited to mobile telephones, personal computers, personal digital assistants (PDAs), etc.

The switch 102 is also coupled via one or more trunk lines 110 to a public switched telephone network (PSTN) 112. The trunk lines 110 carry incoming calls from the PSTN 112 to the switch 102 for processing, and carry outgoing calls from the switch 102 to the PSTN 112. The PSTN 112 is coupled to one or more wireless networks 114, which have associated therewith terminals 116-1, 116-2, . . . 116-K.

It should be noted that the invention does not require any particular type of information transport medium between switch 102 and terminals 116, i.e., the invention may be implemented with any desired type of transport medium as well as combinations of different types of transport media. The one or more wireless networks 114 may be wireless cellular systems of a type well known in the art.

Each of the terminals 116-1, 116-2, . . . 116-K represents an external terminal not corresponding to any internal extension of the switch 102. These terminals are referred to as "external" in that they are not directly supported as terminal endpoints by the switch 102. Like the terminals 106, the terminals 116 may be wired or wireless desksets, mobile telephones, personal computers, PDAs, etc. The terminals 116 are an example of devices more generally referred to herein as "external endpoints."

Although shown as being connected to the wireless network(s) 114 in FIG. 1, one or more of the external terminals 116 could instead be connected directly to the PSTN 112. More generally, the present invention can be implemented using any desired type of external endpoint and network connection.

As will be described in greater detail below, the present invention in accordance with one aspect thereof configures the switch 102 such that one or more of the external terminals 116 are treated substantially as internal switch extensions. Advantageously, this allows a given external terminal to access at least a subset of the desirable call processing features provided by the switch 102.

It should be emphasized that the configuration of the switch, user terminals and other elements as shown in FIG. 1 is for purposes of illustration only, and should not be construed as limiting the invention to any particular arrangement of elements.

Figure 2:
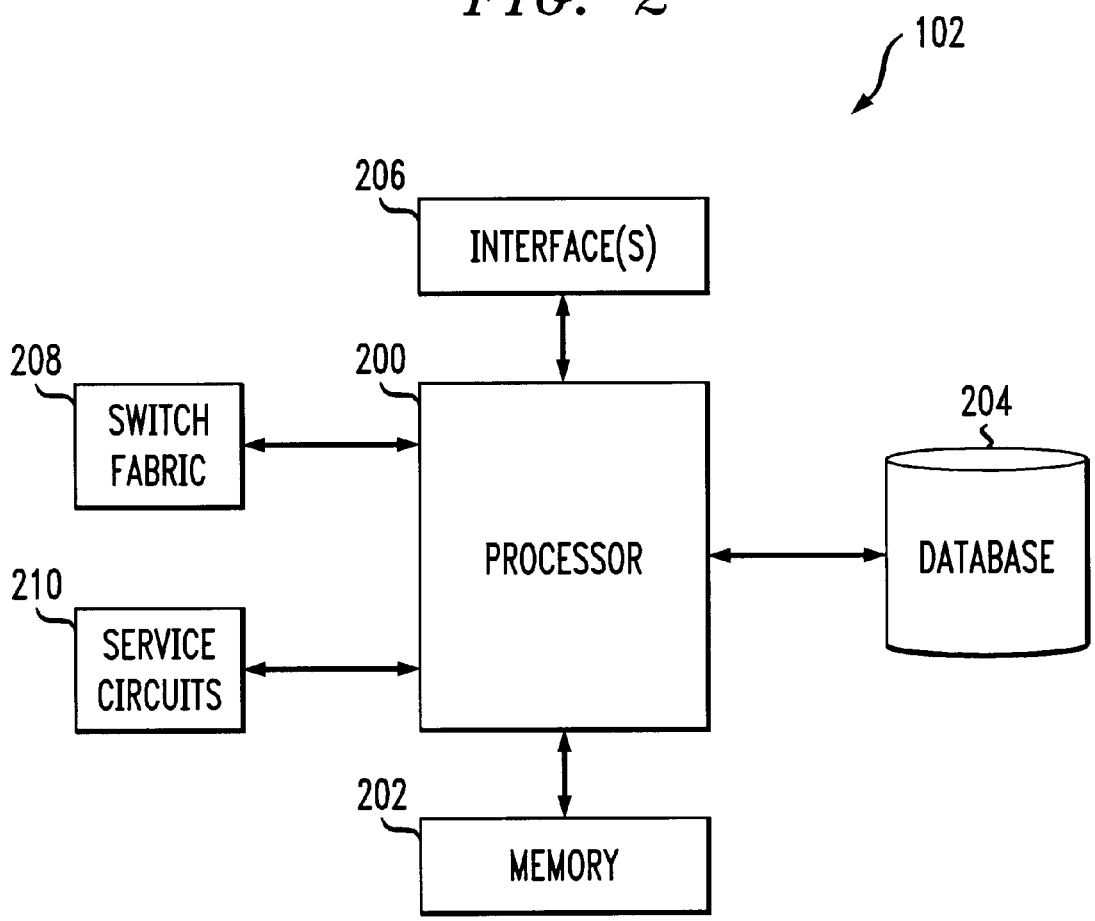
FIG. 2 is a block diagram showing one possible implementation of a switch of the FIG. 2 system.

FIG. 2 shows a more detailed view of one possible implementation of the switch 102 in the system of FIG. 1. The switch 102 in this implementation includes a processor 200, a memory 202, a database 204, one or more interfaces 206, a switch fabric 208, and a set of service circuits 210. The processor 200 may be implemented as a central processing unit (CPU), microprocessor, application-specific integrated circuit (ASIC) or other type of digital data processor, as well as various portions or combinations of such elements. The memory 202 may be a random access memory (RAM), a read-only memory (ROM) or combinations of these and other types of electronic memory devices.

The processor 200 operating in conjunction with the memory 202 executes one or more software programs for providing feature processing and other functions within the switch 102. The manner in which such functions are made accessible to one or more of the external terminals 116 will be described in greater detail below in conjunction with the flow diagram of FIG. 3. Such programs may be stored in memory 202 or another storage device accessible to the switch 102 and executed by processor 200 in a conventional manner.

The database 204 may be, e.g., an optical or magnetic disk-based storage device, or other conventional storage device associated with or otherwise accessible to the switch 102. The database 204 may be used to store, e.g., feature assignments to particular feature buttons or codes, directory number assignments to corresponding call appearances or direct facility termination keys, access restrictions, and other known administrative information regarding the configuration of the system 100, as well as other types of information.

The service circuits 210 may include tone generators, announcement circuits, etc. These circuits and the interfaces 206 are controlled by processor 200 in implementing call processing functions in the switch 102.

The switch 102 may include additional elements which are omitted from FIG. 2 for simplicity and clarity of illustration. For example, the switch may include a port card for each type of user terminal associated therewith. In addition, it will be appreciated by those skilled in the art that the switch 102 may be configured to support multiple user terminals of different types, e.g., wired deskset terminals, wireless deskset terminals, personal computers, video telephones or other advanced terminals, etc.

Also associated with the switch 102 may be an administrator terminal (not shown) which is used to program the operation of the switch 102 during a system administration, e.g., an initial set-up and configuration of the system or a subsequent system-level or user-level reconfiguration.

Other devices not shown in the figures may be associated with the switch 102, such as an adjunct feature server. Such an adjunct may be physically incorporated within the switch, and may be partially or completely implemented using other switch elements such as processor 200 and memory 202.

Figure 3:
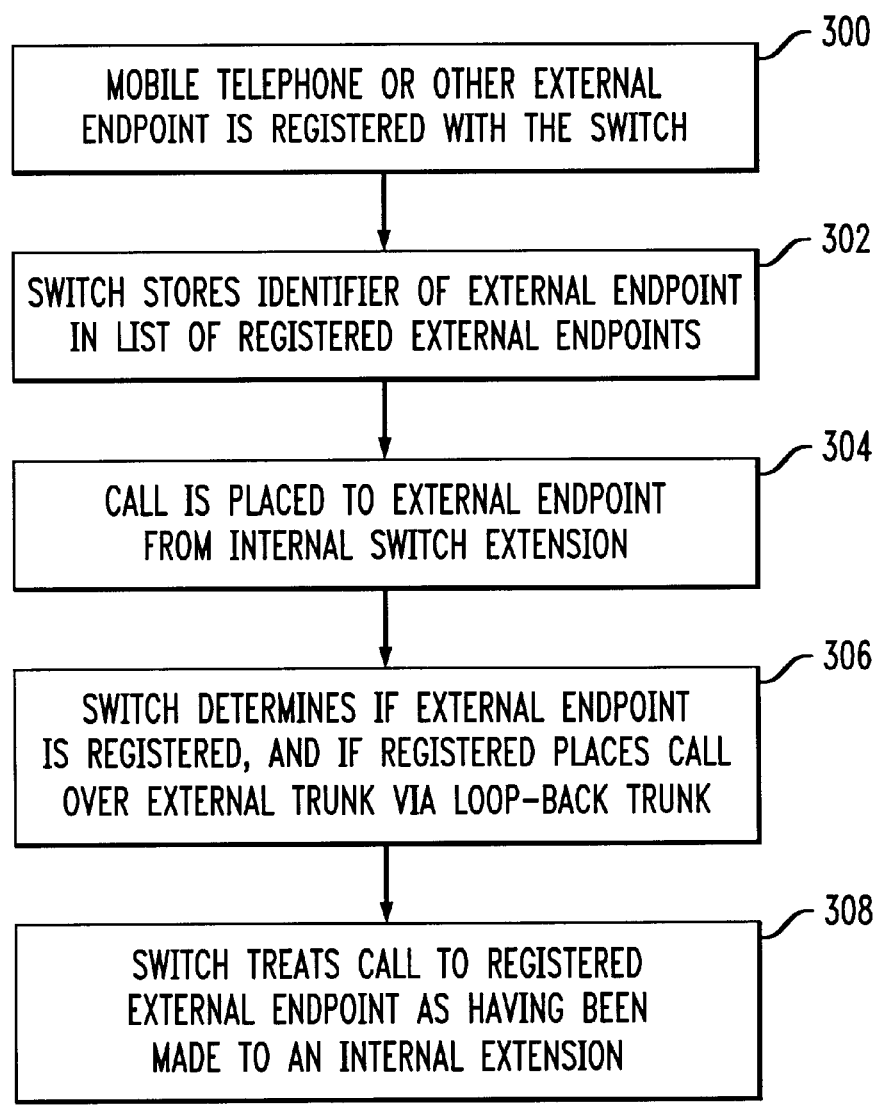
FIG. 3 is a flow diagram illustrating call processing operations performed by the switch in the system of FIG. 1 in accordance with the techniques of the invention.

FIG. 3 is a flow diagram illustrating the manner in which an outgoing call may be directed by the switch 102 to a given one of the external terminals 116. In accordance with the invention, the switch 102 is configured such that the given external terminal to which the outgoing call is directed is treated as an internal switch extension.

In step 300, a mobile telephone or other external endpoint is registered with the switch 102. This registration step can be implemented by a system administrator, or through another suitable manual or automated technique. As a result of this registration process, the switch in step 302 stores an identifier of the external endpoint in a stored list of external terminals or other endpoints registered with the switch. The entry may include, e.g., the identifier associated with the external endpoint, a corresponding internal extension not corresponding to any internal terminal or other endpoint directly serviced by the switch, an internal extension of an associated internal terminal, and/or other information.

A call is placed to the registered external endpoint from an internal switch extension in step 304. The internal switch extension corresponds to an internal terminal or endpoint directly serviced by the switch. For example, the call may originate from one of the terminals 106 of FIG. 1 within premises 104 and corresponding to a particular one of the above-noted internal switch extensions Ext1, Ext2, . . . ExtN.

The call referred to in step 304 may be a call originated by directly dialing from one of the internal extensions a number associated with the external endpoint. As another example, the call may be a call made from one internal extension to another internal extension, where the other internal extension has the external endpoint associated therewith in a manner similar to that described in conjunction with the above-noted registration process. Further details regarding the processing of the latter type of call will be described below in conjunction with FIG. 4.

The switch in step 306 determines if the external endpoint associated with outgoing call has been registered with the switch in the manner previously described. For example, the switch may attempt to map an identifier extracted from the outgoing call to an entry in the above-noted stored list of endpoints. The identifier may be, e.g., the called number of the outgoing call, and may be made apparent to the switch through well-known conventional techniques such as automatic number identification (ANI). Other types of identifiers can also be used. For example, particular identifiers may be assigned to known external terminals or other external endpoints associated with users of the internal extension terminals 106, e.g., by a system administrator or otherwise, and stored in a tabular form in the memory 202 or database 204 using conventional techniques.

The term "stored list" as used herein should be understood to include any set of information stored in a memory or other storage device accessible to the switch. The invention does not require that the information be stored in any particular format, e.g., a tabular format, and numerous suitable storage formats will be readily apparent to those skilled in the art.

As indicated above, once the identifier associated with the outgoing call has been extracted or otherwise made apparent to the switch 102, an attempt is made to map the identifier to a particular entry on the above-noted stored list via table look-up or other suitable technique. If the extracted identifier has a corresponding entry on the stored list, the switch places the call over an external trunk via a loop-back trunk, as indicated in step 306. This illustrative technique for placement of the outgoing call allows the switch to treat the call as being directed to an internal extension, as indicated in step 308, and will be described in greater detail below in conjunction with FIG. 4. If the switch determines that a particular outgoing call does not have an identifier with a corresponding entry on the stored list of identifiers, the call is processed in a conventional manner as any other externally-directed call.

The term "map" as used herein is intended to be construed broadly to include any technique for determining if a given identifier has a corresponding entry on a stored list.

A station display or other information presented to the call originator extension may be configured to indicate that an outgoing call to a registered external endpoint was received at an internal extension of the switch.

It should be noted that it is possible to associate with each of the stored external endpoint identifiers a corresponding actual internal extension, such as extensions designated as N+1, N+2, etc. As indicated above, such extensions may be assigned to registered external endpoints and entered in the stored list. Calls directed to a given external terminal are then processed as if they were directed to the corresponding assigned internal extension. However, the switch can provide the above-described processing without assignment of an actual internal extension to a given external terminal.

Figure 4:
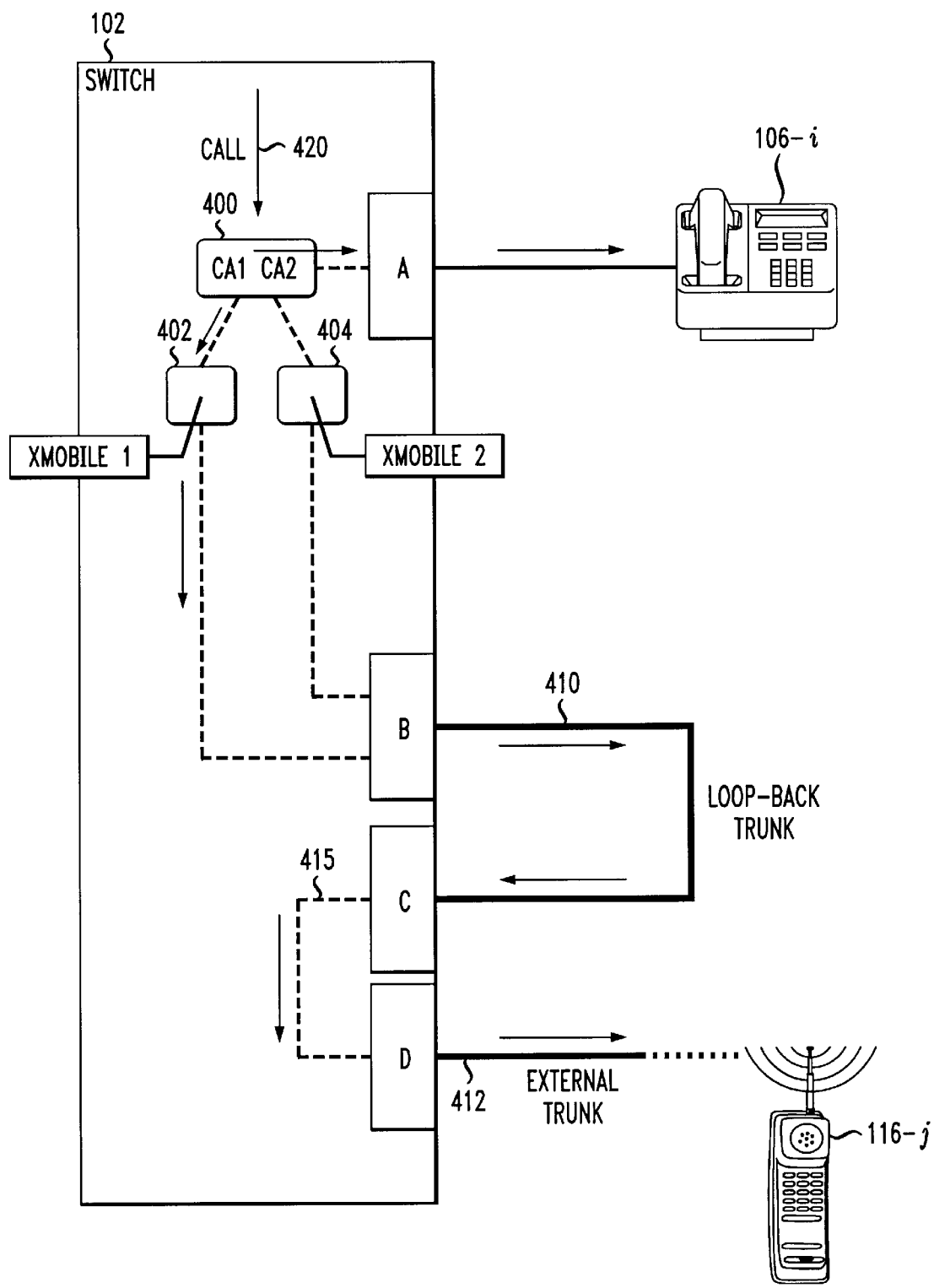
FIG. 4 is a diagram illustrating the manner in which a call is directed by the switch to a registered external endpoint in accordance with the techniques of the invention.

FIG. 4 illustrates the manner in which a call from an internal extension may be directed by the switch 102 to a registered external endpoint via the loop-back trunk referred to in step 306 of FIG. 3. The switch 102 as shown in FIG. 4 includes port cards denoted A, B, C and D, and call processing elements 400, 402 and 404.

Port card A is coupled to a given one of the internal terminals 106-*i* of system 100. Port cards B and C are each coupled to a loop-back trunk 410 as shown. Port card D is coupled to an external trunk 412 that represents one of the trunk lines 110 of FIG. 1 and provides a connection via PSTN 112 and wireless network(s) 114 to a given external endpoint in the form of a mobile telephone 116-*j*. Port cards C and D are coupled via a connection 415 internal to the switch 102 as shown. The ports cards A, B, C and D may be conventional switch port cards of a type well known in the art. For example, port card A may be a conventional digital board card, while port cards B, C and D may be conventional UDS1 cards of a type more specifically known as TN464F or TN2464 and physically configured for 32 channel operation. Port cards B and C are preferably cabled in a loop-back arrangement with transmit leads connected to receive leads.

The terms "trunk" and "trunk line" as used herein should be understood to include POTS telephone lines, integrated services digital network (ISDN) lines, T1 lines or various portions or combinations of these and other types of transport media.

The switch 102 in this illustrative example has two external endpoints registered therewith, denoted as Xmobile 1 and Xmobile 2 in the figure. Each of these registered external endpoints is associated with a corresponding one of the processing elements 402 and 404. The processing elements 402 and 404 may be viewed as comprising portions of the above-noted stored list associated with the respective external endpoints Xmobile 1 and Xmobile 2, and may also include corresponding software code required to implement at least a portion of the previously-described mapping process.

It is assumed for purposes of the present example that the same user associated with the internal extension terminal 106-*i* is also associated with the Xmobile 1 external endpoint, and that the Xmobile 1 external endpoint is the mobile telephone 116-*j* shown in the figure. An entry for the Xmobile 1 external endpoint in the above-noted stored list may therefore include information specifying the associated internal extension.

In operation, a call 420 originated by one of the internal extensions other than that corresponding to terminal 106-*i* is processed by processing element 400 in accordance with first and second call appearances, denoted CA1 and CA2. Elements 400, 402 and 404 as shown in FIG. 4 implement a bridging of analog stations corresponding to Xmobile 1 and Xmobile 2 to a multi-function digital deskset corresponding to terminal 106-*i*. In this particular bridging arrangement, a separate analog station is bridged to each of two call appearances on the digital deskset. The call appearances CA1 and CA2 are thus both associated with the terminal 106-*i*. When a call is delivered to either call appearance it will also be delivered to the corresponding Xmobile endpoint. The call to that Xmobile endpoint then proceeds out via the loop-back trunk 410.

More particularly, FIG. 4 illustrates a call associated with the first call appearance CA1 proceeding in the manner indicated via processing element 402 and port card B to the loop-back trunk 410. From the loop-back trunk 410, CA1 is directed to port card C and then via connection 415 to port card D and the external trunk 412. The connection of the call appearance CA1 from external trunk 412 to the Xmobile 1 external endpoint 116-*j* then proceeds in a conventional manner. The call 420 in this example may therefore be answered at either the internal terminal 106-*i* or the external terminal 116-*j*. If neither of the terminals answer the call, then standard coverage arrangements may take effect. As noted previously, the FIG. 4 example may thus be viewed as a type of bridging between the internal terminal 106-*i* and the external terminal 116-*j*. The switch 102 may also be configured to permit a user to dynamically enable or disable the generation of the call appearance CA1 at the external terminal. Appropriate security codes may be required to prevent tampering with this feature.

It should be emphasized that the particular bridging arrangement of FIG. 4 is shown for illustrative purposes only, and should not be construed as limiting the scope of the invention in any way.

The external terminal 116-*j* in the FIG. 4 example is not tied to any particular fixed external trunk line. Instead, the call 420 is directed to that terminal via an otherwise conventional automatic route selection (ARS) algorithm that dynamically allocates one of a number of available external trunks for use with the call 420. As a more particular example, each of the external endpoints registered with the switch 102 may be associated with a given ISDN-PRI (primary rate interface) trunk group, such that when a call is to be delivered to a registered external endpoint, an available trunk line is selected from the associated trunk group and the call is routed over that line. The external trunk 412 may thus be viewed as one such selected trunk line. Since there is no fixed port assignment for the external terminal 116-*j*, this embodiment of the invention provides more efficient allocation of external trunk resources.

Additional details regarding conventional trunking arrangements in a PBX or other type of communication system switch utilizable in conjunction with the invention may be found in DEFINITY®ECS, Release 9, Administration for Network Connectivity, Issue 2, Document No. 555-233-504, November 2000, which is incorporated by reference herein.

Although the FIG. 4 example involves a call from one internal extension to another internal extension having an associated external endpoint, similar arrangements may be used to direct a call from one internal extension directly to a registered external endpoint that does not have any internal extension associated therewith.

It should also be noted that the loop-back trunk arrangement illustrated in FIG. 4 may be eliminated in other embodiments of the invention. In this case, the call 420 may be routed directly to an external port of the switch after application of the above-noted ARS algorithm or other suitable routing technique.

Advantageously, the invention allows a given external endpoint to be treated as if it were an internal extension directly serviced by the switch. The external endpoint may thereby be provided with access to substantially all of the desirable switch features that are provided to the internal extensions.

As previously noted, the call processing functions described above in conjunction with the illustrative embodiment of the invention may be implemented in whole or in part in the switch 102, e.g., in call processing software thereof utilizing processor 200 and memory 202. For example, one or more of the processing elements 400, 402 and 404 of FIG. 4 may be implemented using software executed by processor 200 and stored in memory 202. Other suitable combinations of hardware and/or software may be used to implement the call processing functions of the invention.

It should again be emphasized the above-described embodiment is illustrative only. Alternative embodiments may utilize different switch and terminal configurations, different types of internal and external endpoints, and different techniques for processing calls directed to terminals or other external endpoints not directly serviced by the switch.

By way of example, the invention, although illustrated in conjunction with mobile telephone external endpoints, is also well suited for use with external interactive voice response (IVR) units having ISDN interfaces, so as to provide a better level of integration between a PBX or other switch and an external IVR unit. Such IVR units are considered a type of external endpoint that may be utilized in conjunction with the invention. As another example, it is possible for a single external endpoint, such as Xmobile 1 or Xmobile 2 in the FIG. 4 embodiment, to support simultaneously two calls sent out over two trunks. More particularly, it is possible for the switch to be configured such that two calls may be directed to a given registered external endpoint using two different trunks, each associated with a different external port of the switch. Such an arrangement can be implemented using a straightforward modification of the above-described arrangements.

These and numerous other alternative embodiments within the scope of the following claims will be apparent to those skilled in the art.

What is claimed is:

1. A method of processing a call in a communication system switch, the method comprising the steps of:

determining if an identifier associated with the call has a corresponding entry in a stored list of external endpoints registered with the switch; and directing the call to an external port of the switch for delivery to a given one of the external endpoints if the identifier associated with the call has a corresponding entry in the stored list of external endpoints registered with the switch;

wherein the call is initiated by entering, at an originating endpoint supported by the switch, a called number of the given external endpoint; and wherein the identifier is extracted by the switch directly from the call without requiring any further interaction between the switch and the given external endpoint.

2. The method of claim 1 wherein the call is originated at an internal endpoint serviced by the switch.

3. The method of claim 1 wherein the call is originated at an originating external endpoint.

4. The method of claim 1 wherein the given external endpoint does not have a fixed external port assignment in the switch.

5. The method of claim 1 wherein the directing step further comprises dynamically selecting from a set of external ports an available external port over which the call is directed to the given external endpoint.

6. The method of claim 5 wherein the dynamic selection of the available external port is implemented using an automatic route selection (ARS) algorithm.

7. The method of claim 1 wherein the directing step further comprises directing the call to the external port of the switch via a loop-back arrangement implemented between port cards of the switch.

8. The method of claim 7 wherein the loop-back arrangement comprises a loop-back trunk between an output port associated with a first port card of the switch and an input port associated with a second port card of the switch.

9. The method of claim 1 wherein the determining step comprises mapping the identifier associated with the call to the corresponding entry in the stored list of external endpoints registered with the switch.

10. The method of claim 1 wherein the corresponding entry comprises the identifier associated with the call and an internal extension assigned to an external terminal and not associated with any internal endpoint serviced by the switch.

11. The method of claim 1 wherein the switch is configured such that a given one of the external endpoints registered with the switch can simultaneously support (i) the call delivered via the external port, and (ii) at least one additional call delivered via another external port of the switch.

12. The method of claim 1 wherein the external endpoint comprises a wireless terminal coupled to a wireless network external to a premises serviced by the switch.

13. The method of claim 1 wherein the external endpoint comprises a wired terminal coupled to a wired network external to a premises serviced by the switch.

14. The method of claim 1 wherein the external endpoint comprises an external interactive voice response (IVR) unit.

15. The method of claim 1 wherein the switch comprises a private branch exchange (PBX).

16. The method of claim 1 wherein one or more of the external endpoints registered with the switch are each bridged to at least one internal endpoint serviced by the switch.

17. A communication system switch for use in processing a call, the switch comprising:
   a memory; and
   a processor coupled to the memory, the processor being operative to determine if an identifier associated with the call has a corresponding entry in a stored list of external endpoints registered with the switch, and to direct the call to an external port of the switch for delivery to a given one of the external endpoints if the identifier associated with the call has a corresponding entry in the stored list of external endpoints registered with the switch;
   wherein the call is initiated by entering, at an originating endpoint supported by the switch, a called number of the given external endpoint; and
   wherein the identifier is extracted by the switch directly from the call without requiring any further interaction between the switch and the given external endpoint.

18. The communication system switch of claim 17 wherein the switch comprises a private branch exchange (PBX).

19. An article of manufacture comprising a machine-readable storage medium storing one or more programs for use in processing a call in a communication system switch, wherein the one or more programs when executed implement the steps of:
   determining if an identifier associated with the call has a corresponding entry in a stored list of external endpoints registered with the switch; and
   directing the call to an external port of the switch for delivery to a given one of the external endpoints if the identifier associated with the call has a corresponding entry in the stored list of external endpoints registered with the switch;
   wherein the call is initiated by entering, at an originating endpoint supported by the switch, a called number of the given external endpoint; and
   wherein the identifier is extracted by the switch directly from the call without requiring any further interaction between the switch and the given external endpoint.

* * * * *